Patented Dec. 23, 1924.

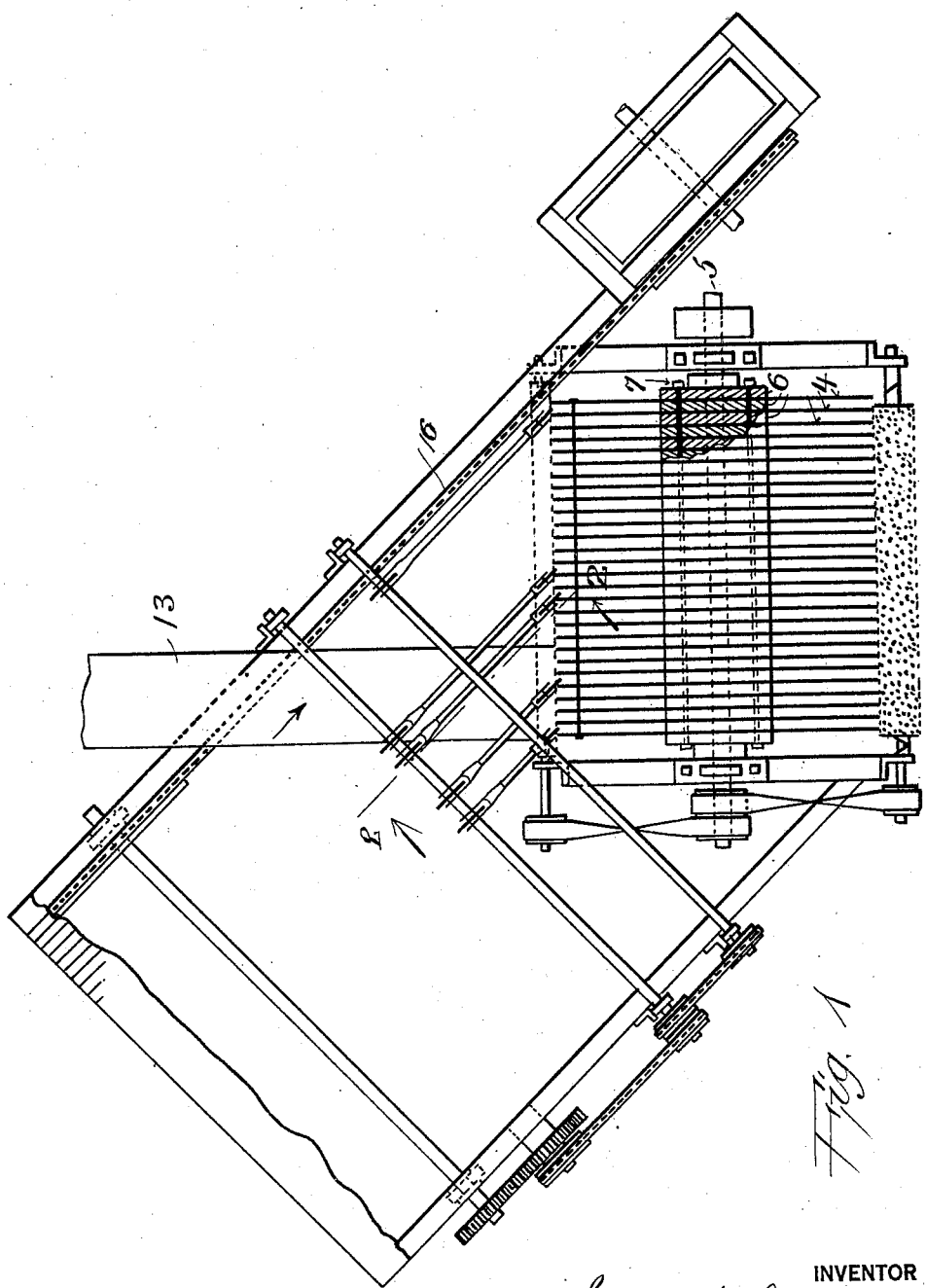

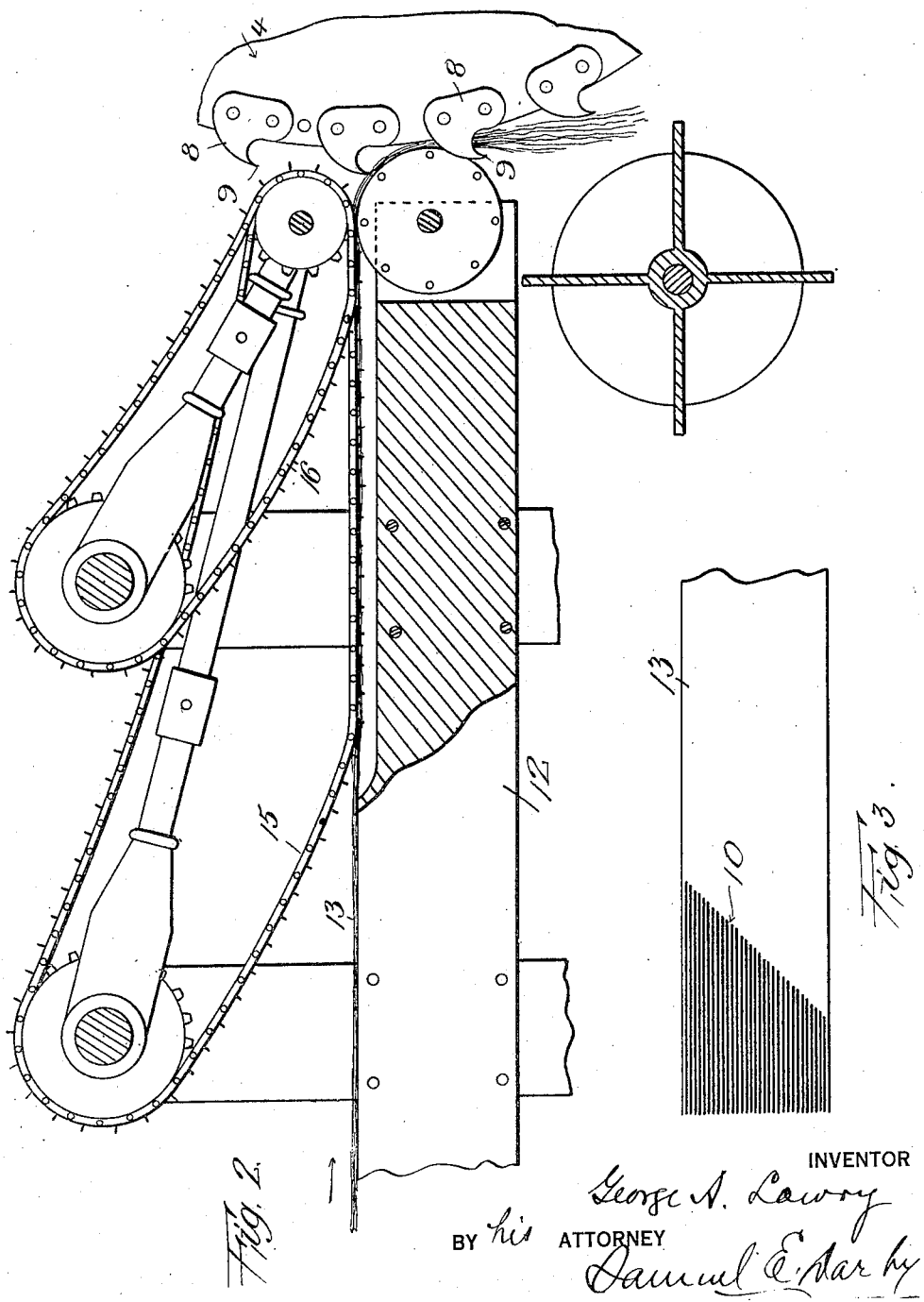

1,520,358

UNITED STATES PATENT OFFICE.

GEORGE A. LOWRY, OF INDIANAPOLIS, INDIANA, ASSIGNOR, BY MESNE ASSIGNMENTS, TO TROPICAL FIBRE CORPORATION, A CORPORATION OF DELAWARE.

PROCESS OF SHREDDING FIBROUS PLANT LEAVES.

Application filed September 23, 1920. Serial No. 412,260.

*To all whom it may concern:*

Be it known that I, GEORGE A. LOWRY, a citizen of the United States, and a resident of Indianapolis, in the county of Marion and State of Indiana, have invented a certain new and useful Process of Shredding Fibrous Plant Leaves, of which the following is a specification.

This invention relates to a method of shredding fibrous plant leaves for the purpose of obtaining and utilizing the fibres thereof.

The object of the invention is to provide a method of shredding fibrous plant leaves which is simple and efficient.

Other objects of the invention will appear more fully hereinafter.

The invention consists substantially in the mode of operation hereinafter set forth, as shown in the accompanying drawing, and finally pointed out in the appended claims.

In many parts of the world and particularly in the tropical and sub-tropical countries, plants grow in profusion which have more or less long and flat leaves which contain fibres suitable for use in the manufacture of various articles of commerce, for instance, the sisal of commerce is a fibre product obtained from the leaves of plants of the cactus family. Again, in certain sections of the world, palm trees of various species grow having leaves containing valuable fibres which are useful in the manufacture of various articles of commerce and in certain other sections of the world plants of the pineapple family, ramie and bear grass, grow in abundance and have leaves which contain a fibre superior in many respects to the sisal fibres obtained from the cactus plants.

The great difficulty heretofore experienced in practice in obtaining the fibres for use in industrial enterprises from the leaves of such plants and trees is in the treatment of the fibrous leaves for obtaining the fibres therefrom. Usually such leaves contain a pectin gum which, under chemical processes which have been attempted, dissolve out and are removed. This is objectionable for the reason that the presence of such gums is beneficial in aiding in retaining the fibre structures in adherence with each other. Various methods of decortication have been employed and is the common method employed in producing sisal but such methods are objectionable because of the expense of the decorticating machines required and the large wastage due to the operation of the decorticating machines, as well as the length of time required. Various attempts have been made to effect the shredding through the action of slitting cutters. The difficulty heretofore, however, in the use of slitting or shredding cutters has been that a set or gang of cutters or successive cutting operations effect the penetration of the leaves at points lying in substantially the same line transverse to the width of the leaves to be slitted or shredded. This results in severing fibres from the leaves particularly where it is desired to secure a fine shredding action. The reason for this is that the resistance background of the leaf disappears as the slitting operations proceed from one edge of the leaf transversely across the leaf, in other words, where it is attempted to effect the shredding of the leaf to an extreme degree of fineness of the shreds, that is, where the slitting cuts come close together, the fibres become severed from the leaves.

It is among the special purposes of my present invention to provide a method of operation which avoids the above noted and other objections heretofore encountered and to provide a method of operation which permits the shredding of fibrous leaves to an extremely high degree of fineness of shreds without wastage of the fibres by severance of the fibres from the leaf and to accomplish this operation quickly, certainly, and economically.

In carrying out my invention, I propose to so arrange the slitting cutters and the feed by which the fibrous leaves are presented to their action and the direction of such feed as that each successive cutter penetrates the leaf at a point farther removed from the advancing end of the leaf than the preceding cutter, thereby defining the points of entry of the slitting cutters into the body of the leaf in effecting their slitting action as in a line inclined to or diagonal with respect to the length of the leaf. By reason of this arrangement, the penetrating action of each shredding cutter is afforded the resistance of the full transverse width of the leaf. This I regard as an exceedingly important and valuable feature and step of the operation involved in the method of my invention.

In the accompanying drawing I have indicated an illustrative form of apparatus for carrying out the method of operation embodying my invention, and wherein—

Fig. 1 is a view in top plan somewhat diagrammatic of a form of apparatus suitable for carrying out my invention, parts being broken off;

Fig. 2 is a view in vertical section on the plane indicated at 2—2 of Fig. 1, looking in the direction of the arrows, parts being broken off.

Fig. 3 is a view in top plan, illustrating a fibrous leaf to be shredded and the shredding action as carried out in accordance with the principles of my invention.

In carrying out my invention I propose to slit or shred the fibrous leaf in lines longitudinally of the leaf. The shredding may be accomplished by any suitable or convenient arrangement of slitting or shredding cutters. A simple arrangement is shown for accomplishing this purpose wherein a series of disks 4 are mounted upon a rotatable shaft 5 which may be driven in any suitable or convenient manner, said disks being held together on said shaft to rotate therewith and spaced apart from each other a suitable distance by means of spacing blocks or disks 6 or otherwise, said disks being clamped together by suitable rods 7. The cutters 8 are shown in this instance in the form of curved teeth similar to gin removable saw teeth with a sharp pointed penetrating end 9. Instead of feeding the fibrous leaves to the cutters in the planes of action of the cutters, that is, instead of the leaves being advanced longitudinally in straight lines to the action of the shredding cutters, I propose, in accordance with my invention to feed the leaves in a direction diagonal to the plane of operation of the cutters, that is, I propose in accordance with my invention to impart to the leaves a feeding action which is both in the direction of length of the leaf and simultaneously therewith, moving the leaves laterally, the combined result being a direction of feed inclined with reference to the plane of action of the cutters. The result is that each succeeding cutter penetrates the body of each leaf at a point farther removed from the front or advancing end of the leaf than the point of penetration of the immediately preceding cutter, so that the line of the points of penetration of successive cutters is diagonally across instead of transversely across the width of the leaf. This is clearly indicated in Fig. 3 by the line 10, which indicates the line of the successive points of penetration of the cutters during the feed of the leaves in a direction inclined in the plane of action of the cutting disks. It will be observed that by presenting the leaves in an inclined line or direction of feed, the leaves are progressed not only in the direction of their length towards the cutters but are carried simultaneously therewith laterally so that the ultimate result is a feed in the component of these directions. The angle of inclination of the line of feed may be varied and therefore my invention is not to be limited or restricted in this respect. I have found in practice that excellent results are secured where the line of feed of the leaves is so inclined as to bring the line of penetration of the shredding cutters at approximately 45° to the transverse width of the leaf.

My present invention is not concerned with the details of the mechanism employed for effecting the feed or presentation of the leaves nor with specific details of structure of the shredding cutting devices. For illustrative purposes, however, I have shown a table 12, upon which the leaves, indicated at 13, are placed, the leaves being disposed on the table to extend in the direction of the planes of operation of the cutters. Operating upon the leaves to feed them is a feed device which may be of any suitable form, such, for instance, as a sprocket chain, not shown, and arranged to carry the leaves forwardly and laterally, as above described, to secure a component of directions of feed inclined with reference to the plane of action of the cutters. If desired, and in order to hold the leaves in proper position, auxiliary feeding and holding devices, illustrated in this instance, as sprocket chains 15, 16, may be employed. The ends of the leaves are progressed over the edge of the table 12 between suitable retaining rollers above and below the table which properly hold and present the leaves to the action of the shredding cutters which operate adjacent to the table edge.

It will be understood that by reason of the inclined direction of feed of the leaves and the consequent diagonal relation of the line of points of penetration of the leaf by the shredding cutters, each penetration action of the cutter is afforded the resistance of the entire transverse width of the leaf, thereby avoiding the danger of severing the fibres from the leaf and insuring a closer spacing of the shredding cutters and hence finer shredding action.

As above indicated, a method embodying my invention may be carried out by hand or by any suitable or convenient arrangement of mechanism.

Having now set forth the objects and nature of my invention and the method of carrying out the same into practical operation, what I claim is new and useful and desire to secure by Letters Patent is:—

1. The process of shredding fibrous leaves which consists in successively slitting the leaves in the direction of length thereof, each successive slit commencing at a point farther removed from the end of the leaf than the preceding slit.

2. The process of shredding fibrous leaves which consists in successively slitting the leaves in the direction of length thereof, the individual slittings commencing in a line extending in an inclined direction transversely across the leaf.

3. The process of shredding fibrous leaves which consists in successively slitting the leaves in the direction of length thereof, each successive slit commencing at a point in advance of the beginning of the previous slit thereby having the resistance of the full transverse width of the leaf.

4. The process of shredding fibrous leaves which consists in successively slitting the leaves in the direction of the length thereof, and feeding the leaves in a line inclined to the direction of the slitting action whereby the advanced point of each slit is supported laterally by the unslitted portion of the leaf.

5. The process of shredding fibrous leaves which consists in slitting the leaves longitudinally and feeding the same in the direction of the slits so formed and laterally past the plane of slitting action whereby each slit is advanced under lateral support of the unslitted leaf portion.

6. The process of shredding fibrous leaves which consists in successively advancing the slits in the leaves in the direction of length thereof, while the leaves are moved at an angle to the planes of slitting action to form shreds of increasing length and causing a change in direction of said shreds as they are formed.

7. The process which consists in successively slitting a fibrous leaf, the successive slits commencing in a line inclined to the length of the leaf, each slit being in the direction of the length of the leaf.

8. The process of shredding fibrous leaves which consists in presenting the leaves to be shredded to the slitting action to form shreds and causing said shreds to change their course of direction as the shreds are formed, each succeeding shred being formed at a point farther removed from the advancing end of the leaf.

9. The process of shredding fibrous leaves which consists in successively slitting the same in the direction of the length thereof, the successive slits commencing in a line which progresses in a direction inclined to the length of the leaf.

10. The process of shredding fibrous material which consists in successively slitting the same in the direction of the length thereof, the slittings commencing in a line extending in a direction inclined transversely across the material.

In testimony whereof I have hereunto set my hand on this 3rd day of September A. D., 1920.

GEORGE A. LOWRY.